April 9, 1957 F. STASTNY 2,787,809
PRODUCTION OF POROUS SHAPED ARTICLES FROM THERMOPLASTIC SUBSTANCES
Filed March 24, 1953
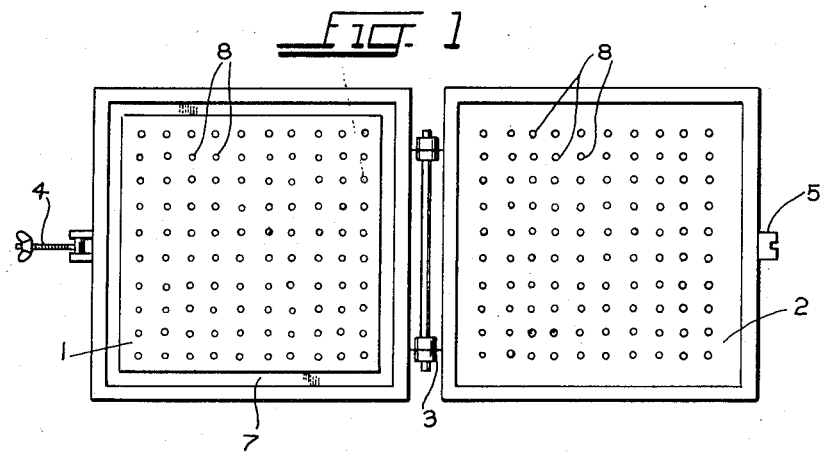
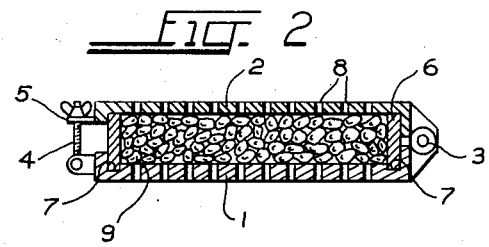
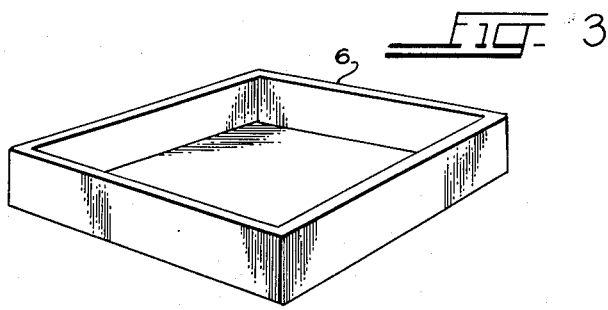
INVENTOR.
FRITZ STASTNY
BY
Att'ys.

United States Patent Office
2,787,809
Patented Apr. 9, 1957

2,787,809

PRODUCTION OF POROUS SHAPED ARTICLES FROM THERMOPLASTIC SUBSTANCES

Fritz Stastny, Weinheim, Germany, assignor to Badische Anilin- & Soda-Fabrik Aktiengesellschaft, Ludwigshafen (Rhine), Bundesrepublic Deutschland Application March 24, 1953, Serial No. 344,473

Claims priority, application Germany, March 25, 1952

10 Claims. (Cl. 18—48)

This invention relates to a process for the production of porous shaped articles from small particles of a thermoplastic substance being incompletely foamed-up and containing still a liquid raising agent.

In the copending application Serial No. 282,681, filed April 16, 1952, by Fritz Stastny, now U. S. Patent No. 2,744,291, the inventor of the present application, and Karl Buchholz, there has been disclosed a process for the production of porous shaped articles in which fine-grained synthetic thermoplastic substances which contain, in homogeneous dispersion, liquids which do not dissolve or only swell the thermoplastic substances and of which the boiling point is lower than the softening point of the synthetic substances are heated in closed molds to temperatures above the boiling point of the added liquid and above the softening point of the thermoplastic substance. By this process the individual particles of thermoplastic substance are united together to form homogeneous porous shaped articles. Thus for example porous shaped articles having a specific gravity of 0.08 to 0.3 are obtained from comminuted polystyrene which contains 6% of petroleum ether having the boiling range 35° to 60° C. in homogeneous dispersion therein.

As a rule less than 10% of the molds used for the production of the shaped articles is filled with the comminuted thermoplastic substance containing the raising agent and the residual volume of the mold is filled up by the foaming-up of the thermoplastic substance. The internal pressures thus set up are relatively high and are of the order of about 3 atmospheres.

I have now found that porous shaped articles of synthetic thermoplastic substances can also be advantageously prepared by starting from small-particled, porous but incompletely foamed-up thermoplastic synthetic substances which still contain liquids which do not dissolve or only swell the thermoplastic substance and of which the boiling point is lower than the softening point of the thermoplastic substance, and heating it in closed molds to temperatures above the boiling point of the liquid serving as raising agent and above the softening point of the thermoplastic substance. This method has the advantage that the pressure set up in the molds is considerably lower and the foaming-up process can be carried out in a much shorter time.

Polystyrene, polyvinyl chloride, polyvinylidene chloride, polyacrylic esters, polymethacrylic esters, polyacrylonitrile, interpolymers of butadiene or other dienes and styrene or acrylonitrile are, for example, suitable for processing according to the said method.

It is of special advantage to use for the process thermoplastic substances in which the liquid raising agent is polymerized in, and incompletely foamed-up bead polymers of thermoplastic substances containing raising agents are of special importance.

Suitable organic liquid raising agents are for example for polystyrene volatile aliphatic or cycloaliphatic hydrocarbons having a boiling range from 30° to 70° C., such as petroleum ether, further pentane, hexane, heptane, cyclopentane, cyclohexane and cyclopentadiene or mixtures of these liquids. The content of these liquids in the polystyrene may be preferably between 3 and 15% relating to the total weight of the mixture. Small particles of polystyrene containing these liquids having a diameter of from about 0.5 to 5 mm. and a bulk density of about from 350 to 650 grams/liter are preferably used.

In order to prepare porous, incompletely foamed-up, small-particled thermoplastic substances from polymers containing raising agents, the particles of thermoplastic substance containing raising agent is heated above the softening point of the substance for such a length of time that only part of the liquid raising agent evaporates. This first heating may be carried out for example with hot water, steam or infra-red radiation, the particles of thermoplastic substance preferably not being placed in molds in order to prevent agglomeration during the foaming-up. For example polystyrene beads containing petroleum ether can be incompletely foamed-up by immersion in water at 75° to 100° C. for about 3 to 10 minutes. If polystyrene with a high softening range is used, the heating may be carried out in a hot salt solution, for instance a magnesium chloride solution having a temperature from 100° to 120° C. After this first heat treatment the porous, incompletely foamed-up polystyrene particles have preferably a bulk density of about 15 to 200 grams/liter. Dyestuffs may be added to the water used for foaming-up in order to color the thermoplastic substance during the foaming-up. In the case of particles of thermoplastic substance which have been previously foamed-up to a substantial extent, it is advantageous to store them in molds at room temperature for about 2 to 3 weeks before the complete foaming-up. For the purpose of complete foaming-up, the porous polystyrene still containing the raising agent is introduced into a closable mold and again heated, preferably to temperatures from 10° to 40° C. higher than in the first heating. It is advantageous to fill the molds used for the production of the shaped articles as completely as possible with the partly foamed-up particles of thermoplastic material.

The second heat treatment for the production of the final shaped article may be carried out in water, steam, air, in organic liquids which do not dissolve the thermoplastic substances, by high frequency heating or by infra-red radiation or the like. When employing steam for the foaming-up, the steam may be blown in through holes provided in the molds.

The process is suitable for the production of shaped articles of any shape and size, as for example refrigerator casings, toys, shoe lasts, clothing buckles, parts of aircraft, parts of boats, floats, pontoons, ball floats, insulating layers for metal, wood or synthetic plates and the like. The shaped articles may contain reinforcements or metal parts which are introduced into the mold before the second foaming-up process. Glass fibers or fabric prepared from glass fibers may also be embedded in the shaped articles as strengthening insertions. The surface of the shaped articles may be strengthened with wood, metal or synthetic plates, as for example of copolymers from unsaturated polyesters and styrene. The shaped articles may also contain softeners or extraneous substances, such as fillers of all kinds, as for example cork meal or wood meal. Fine-grained porous material obtained as waste may be used as a cork meal substitute and may be employed for example for filling hollow spaces in cooling vessels. It may also be used as an intermediate or surface layer on foils or metal surfaces and may be united by adhesives or lacquers.

The following examples will further illustrate this invention but the invention is not restricted to these examples. The parts are by weight.

Example 1

1000 parts of water, 2.5 parts of polyvinyl pyrrolidone, a mixture of 500 parts of monostyrene, 12.5 parts of benzoyl peroxide and 40 parts of petroleum ether having the boiling range 52° to 57° C. are introduced into a stirring autoclave and polymerized while stirring for 60 hours at 50° C. under reflux. A bead polymer having a bead diameter of about 1 to 2 millimeters is obtained. The polymer beads contain petroleum ether in homogeneous dispersion therein. The polymer is filtered off, washed with water and freed from adherent water.

The beads are then immersed for 6 minutes in water at 90° C., whereby an increase in volume of about 300% takes place. Porous beads are obtained having a bulk density of 65 grams per liter. The incompletely foamed-up beads are introduced into a closable, plate-shaped mold of a height of 5 centimeters and a volume of 1000 cubic centimeters so that the mold is completely filled with the beads. The mold is then closed and kept for 10 minutes in steam at 120° C. A compact plate very resistant to compression and fracture is obtained having a specific gravity of 0.065; it may be used as an insulating material against heat, cold or sound or as a base for floor coverings and the like.

Example 2

450 parts of polymethacrylic acid methyl ester are dissolved in 550 parts of monomeric methacrylic acid methyl ester and then 120 parts of cyclopentane and 6 parts of benzoyl peroxide are added to the solution while mixing well. The homogeneous mixture is stored for 30 days at 35° C. and then broken up mechanically, for example in a cross beater mill, into particles having a length and breadth of about 2 to 5 millimeters. The particles contain cyclopentane in homogeneous dispersion therein. These particles are then stored for 10 minutes in water at 95° C.; they thus undergo marked increase in volume and acquire a porous structure. These porous particles are then introduced between two cylindrical containers provided with bottom plates, one having an internal diameter 5 centimeters less than the other and a length 5 centimeters less than the other, so that the intermediate space between the two containers is completely filled. On the upper opening of the outer container there is placed a metal plate weighted with 10 kilograms and the whole is stored in steam at 140° C. for 15 minutes and then cooled. A compact insulating layer is formed between the two containers which has a very small heat transfer and may be employed in practice for example for the preparation of thermos flasks, as an insulating layer for beer casks and the like. The outer container may be removable so that a porous, compact outer insulating layer is obtained which may be employed in this form for example as a storage vessel for ice, liquid air or the like.

Example 3

The polystyrene beads containing raising agent prepared according to Example 1, which have been subjected to a pretreatment by storage for 4 minutes in water at 90° C. and which have a bulk density of 70 grams per liter are introduced into a two-part plate-like iron mold of 1000 cubic centimeters capacity so that the mold is completely filled. Steam at a temperature of 120° C. is led for 11 seconds into the filled mold through holes of 1 millimeter diameter which are distributed at intervals of about 1 centimeter over the whole external surface of the mold, and the whole is then cooled for 30 seconds in water at room temperature. A compact uniform plate having a specific gravity of 0.065 is obtained.

Example 4

A glass fiber fabric is laid at the upper and lower sides of a closable 2-part iron mold of 70 centimeters length and 6 centimeters height. The glass fiber fabric has been previously impregnated with a mixture of unsaturated polyesters on the basis of maleic acid and glycols and styrene and the mixture polymerized for 8 minutes at 95° C. to such an extent that the impregnated fabric has become semisolid and lies against the upper and lower sides of the mold in an airtight manner. Into the mold between the two glass fiber fabrics there are then introduced the polystyrene beads having a specific gravity of 0.065 and still containing raising agent obtainable according to Example 1 by pretreatment for 7 minutes in water at 90° C., so that the mold is entirely filled by the previously foamed-up polystyrene beads. The closed mold is then stored for 15 minutes in water at 95° C. After removal from the mold, a shaped article is obtained which contains in the centre a foamed polystyrene insulation which is 4.5 centimeters thick and which is compact and closed and which is provided with an impregnated glass fabric covering on the outer surfaces. The shaped article is suitable for example as a closure part for cooling vessels. Other shaped articles can be prepared in a similar manner, as for example refrigerator casings, ball floats, pieces of furniture, insulating plates, wall plates, containers of all kinds, parts of boats, aircraft parts and other shaped articles of any size and shape which may be provided with external layers of polyesters containing glass fabric insertions.

Example 5

A bead polymer of polystyrene prepared as described in Example 1, which contains a foaming agent, is placed in water having a temperature of 90° C. for 6 minutes. The foamed beads, after drying, have a bulk density of 65 grams per liter. A mold having 20 centimeters in length and width and 3 centimeters in height is completely filled up with the prefoamed beads and steam having a temperature of 110° C. is blown into the mold for 11 seconds through perforations provided on all sides of the mold. The steam is then shut off and cold water is passed through the mold. After cooling for 70 seconds the mold is opened and the molding removed. It is a porous board of high crushing strength having a specific gravity of 0.075.

The technique of making boards as aforesaid, including the opening of the mold, the charging-in of the polystyrene beads, the closing of the molds, the blowing-in and shutting-off of steam, and the cooling of the mold, can also be rendered automatic and thus a high operation speed be obtained.

Example 6

The polystyrene beads obtained as described in Example 1, containing a foaming agent, are placed in water having a temperature of 85° C. for 5 minutes, their volume being thus increased by about 250 percent. The prefoamed porous beads are then used to fill up a mold which is the negative of an animal's body, for example a penguin's body, and air having a temperature of 95° C. is blown into the mold for 200 seconds through a few slits in the mold which are about 0.5 millimeter in width. The mold is then cooled with water for 2 minutes.

The porous body having a specific gravity of 0.08 is true to shape. It is dipped in an aqueous plastics dispersion and thus provided with a coherent coating. To this coating a conventional lacquer is applied by the spraying process.

Example 7

The polystyrene beads prepared as described in Example 1, having a particle size of from 1 to 3 millimeters, are foamed in water having a temperature of 95° C. for 20 minutes, dried after cooling and then stored for 4 weeks at ordinary pressure or for 5 days at a pressure of 2 to 3 atmospheres. 150 grams of the prefoamed beads are then put in a closable mold having a capacity of 1000 cubic centimeters. Through perforations provided at various points of the mold steam having a temperature of 125° C. is blown in for 20 seconds. The mold is then placed in a room in which the temperature is adjusted to 5° C. and the pressure reduced to 0.1 atmosphere, and kept therein for 5 minutes. The molding obtained has a high crushing strength and surface hardness. Its specific gravity is 0.015. It can be widely used in the insulation field.

*Example 8*

The bottom of a closable two-part iron mold is covered with a fine-meshed fabric, to both sides of which fine-grained polystyrene has been applied by means of a 10 percent aqueous solution of polyvinylmethyl ether. The mold is then filled with fine-grained partially foamed polystyrene of a bulk density of 30 grams per liter which still contains petroleum ether as a foaming agent, covered with a fabric of the same type as that placed on the bottom, closed, and treated with steam of 110° C. which is blown in through perforations provided in the wall for 11 seconds. The mold is then exposed to a temperature of 180° C. for 5 minutes in a heating closet and then cooled. The porous molding obtained has a hard top and bottom side and can be used as a grounding for linoleum, and as a flooring material.

*Example 9*

The bottom of a mold having 10 centimeters in length and width and 3 centimeters in height in which perforations are provided at various points is completely covered by spreading with fine-grained polystyrene. The mold is then completely filled up with fine-grained partially foamed polystyrene of a bulk density of 35 grams per liter which still contains petroleum ether as a foaming agent. The closed mold is stood in water of 95° C. for 10 minutes and then cooled down to room temperature. The board removed therefrom after cooling has a hard surface and can be used, for example, for wall coating purposes.

The fine-grained polystyrene used as a bottom layer as aforesaid can also be variously dyed so that the covering layer of the porous board exhibits a varicolored pattern. Instead of polystyrene other fine-grained materials may be used, such as wood flour, wood shreds, sawdust, hard rubber powder, disintegrated rubber waste, fine gravel, fine sand, waste fabrics, disintegrated spinning waste, disintegrated synthetic resins, metal powders and the like materials. Unless incorporated in the surface of the moldings alone, they also act as extenders for the foamed polystyrene.

*Example 10*

The bottom side of a partially perforated mold having 60 centimeters in length, 10 centimeters in width and 8 centimeters in height is covered with a fine-meshed fabric to which a plasticized polyvinyl chloride is applied in crumb form with the aid of acetone. The mold is then charged with fine-grained partially foamed polystyrene of a bulk density of 30 grams per liter which still contains petroleum ether as a foaming agent. After closing the mold, steam having a temperature of 115° C. is blown in through the perforations for 90 seconds. The board removed from the mold after cooling can be used as a wall coating material, as a material for building partition walls, as intermediate layers in house building, as well as a roofing and flooring material.

*Example 11*

Compact polystyrene which contains about 10 percent of petroleum ether of a boiling point of from 42° to 48° C. as a foaming agent in a homogeneous distribution is reduced to granular form with a particle size of 1 to 5 millimeters by grinding. The fine-grained polystyrene is placed in water having a temperature of 96° C. for 4 minutes and cooled. The polystyrene which is now available in the form of porous individual particles having a bulk density of 25 grams per liter is charged into a closed, ball-shaped, perforated metallic mold to fill the mold up completely. The mold is then placed in boiling water for 10 minutes and cooled. The ball-shaped molding removed after cooling is wrapped up with a thin aluminum sheet, closely wound with twined glass threads and then placed in a ball-shaped metallic mold which is by 10 centimeters larger in diameter than the mold in which the molding was prepared. The ball-shaped molding is placed in the second mold at equal distance from any point of the inner wall thereof. The mold has closable openings at various points through which a mixture of an unsaturated polyester from maleic acid and a glycol and styrene, to which 0.5 percent of benzoyl peroxide have been added, are introduced. The mold is then closed, heated at 60° C. for 5 minutes and allowed to stand at 30° C. for 2 hours. The ball-shaped body then removed from the mold has a compact, smooth surface of polyester resin in which glass threads are incorporated. The body has a high crushing strength and can be used, for example, as buoys for fishing nets.

*Example 12*

Fine-grained polystyrene which contains 6 percent of hexane in a homogeneous distribution is placed in water having a temperature of 95° C. for 3 minutes. The prefoamed material, while still in a moist condition, is charged in a cylindrical metallic mold wound with steam coils for outside heating. The mold, being completely filled up with the expansible prefoamed polystyrene, is closed, heated with steam for 5 minutes at 110° C. and then cooled. The cylindrical shape obtained is adapted for use as an insulating support.

*Example 13*

A fine-grained polystyrene is treated as described in Example 12. The prefoamed material is dried, then having a bulk density of 30 grams per liter, and charged in a mold for a spacer for electrical insulations provided with perforations 1 millimeter in diameter at various points. The filled-up mold is closed and hot air of 95° C. is blown in for 15 minutes through the perforations. The mold is then cooled down to 35° C. and the shape removed. It has a specific gravity of 0.030.

The drawing illustrates the method of the invention wherein small particles of a porous but incompletely foamed-up thermoplastic substance which still contains liquids in which the thermoplastic material is insoluble and which boil below the softening point of the thermoplastic substance, are heated and expanded in a mold, preferably in contact with a hot fluid, as described above, to form porous articles having the shape of the mold.

In the drawing,

Figure 1 is a plan view of the body of a plate mold in open position;

Figure 2 is a vertical sectional view of the mold in closed position, containing small particles of the porous incompletely foamed-up thermoplastic material; and Figure 3 is a perspective view of the frame of the mold which together with the body of Figure 1 constitutes the mold.

The body of the mold includes two metal plates 1 and 2 connected by hinge joints 3, for opening and closing the mold. A lock fastener 4 which is a wing nut and bolt combination pivotally connected to one plate 1 is provided for engagement with a recessed lock plate 5 projecting from the other plate 2, to lock the mold in closed position. Prior to closing, a frame 6 is inserted in a recess 7 provided in one plate 1, and the body is closed to secure the frame tightly between the plates 1 and 2. In the embodiment illustrated, a number of perforations 8 are provided in the plates 1 and 2, for entry of a fluid heat carrier.

In producing a porous article, a plate in the apparatus shown, small particles of a porous but incompletely foamed-up thermoplastic material 9 which still contains a volatile organic liquid as described above are charged to the mold when open, and the mold is closed as illustrated in Figure 2. An amount of thermoplastic material is preferably employed which will entirely fill the mold cavity. The closed mold containing the incompletely foamed-up thermoplastic material is immersed in a hot fluid, such as water, organic liquids which do not dissolve the thermoplastic material, or steam and so forth as described above, to heat the thermoplastic material above its softening point. The organic liquid contained therein then volatilizes, exerting pressure, and causes the particles to expand or foam up and fill the mold, rapidly forming a porous article. The mold is then cooled and opened, and the resulting shaped article is removed. It is true to the size and shape of the mold, having a good proportion-retentivity.

What I claim is:

1. A process for the production of porous shaped articles of synthetic thermoplastic substances which comprises subjecting small particles of a porous and partially but incompletely foamed-up synthetic thermoplastic material which still contain liquids in which the thermoplastic material is insoluble, these liquids having a boiling point which is lower than the softening point of the thermoplastic material, to a heating in a closed mold which permits the escape of gases but retains said thermoplastic material at a temperature above the boiling point of the liquid and above the softening point of the thermoplastic material.

2. A process for the production of porous shaped articles of polystyrene which comprises subjecting small particles of porous and partially but incompletely foamed-up polystyrene which still contain a liquid in which the polystyrene is insoluble, this liquid having a boiling point which is lower than the softening point of the polystyrene material, to a heating in a closed mold which permits the escape of gases but retains said polystyrene material at a temperature above the boiling point of the liquid and above the softening point of the polystyrene.

3. A process for the production of porous shaped articles of polystyrene which comprises subjecting small particles of porous and partially but incompletely foamed-up polystyrene which still contain a liquid volatile hydrocarbon in which polystyrene is insoluble, this liquid having a boiling point which is lower than the softening point of polystyrene, to a heating in a closed mold which permits the escape of gases but retains said polystyrene at a temperature above the boiling point of the liquid and above the softening point of the polystyrene.

4. A process for the production of porous shaped articles of polystyrene which comprises heating small particles of polystyrene containing from 3 to 15% of a volatile liquid hydrocarbon boiling between 30° and 70° C., the polystyrene being insoluble in this liquid, to a temperature between 75° to 120° C. and above the softening point of the polystyrene until porous and partially but incompletely foamed-up particles are obtained containing still volatile liquid hydrocarbon, subjecting then the incompletely foamed-up particles of porous polystyrene in a closed mold which permits the escape of gases but retains said polystyrene to a heating at a temperature which is from 10° to 40° C. higher than the first heating.

5. A process as claimed in claim 4 wherein the first and the second heating process are carried out in hot water.

6. A process as claimed in claim 4 wherein the first heating process is carried out in hot water and the second heating process by heating with steam.

7. A process as claimed in claim 4 wherein the first and the second heating process are carried out by heating with steam.

8. A process for the production of porous shaped articles of polystyrene which comprises heating small particles of polystyrene containing from 3 to 15% of petroleum ether having a boiling range between 30° to 70° C. to a temperature between 75° and 120° C. and above the softening point of the polystyrene until porous and partially but incompletely foamed-up particles are obtained containing still petroleum ether, subjecting then the incompletely foamed-up particles of porous polystyrene in a closed mold which permits the escape of gases but retains said polystyrene to a heating at a temperature which is from 10° to 40° C. higher than the first heating.

9. A process for the production of porous shaped articles of polystyrene which comprises heating small particles of polystyrene having a bulk density of from 350 to 650 grams per liter containing from 3% to 15% by weight of a volatile liquid hydrocarbon boiling between 30° C. and 70° C., the polystyrene being insoluble in this liquid, at a temperature between 75° C. to 120° C. and above the softening point of the polystyrene until porous and partially but incompletely foamed-up polystyrene particles are obtained having a bulk density of from 15 to 200 grams per liter, subjecting then said porous particles of polystyrene in a closed mold which permits the escape of gases but retains said polystyrene material to a heating above the boiling point of the said liquid and above the softening point of the polystyrene.

10. A process as claimed in claim 9, wherein said small particles of polystyrene having a bulk density of from 15 to 200 grams per liter are stored and thereafter heated in said mold.

References Cited in the file of this patent

UNITED STATES PATENTS

| | | |
|---|---|---|
| 2,268,160 | Miles | Dec. 30, 1941 |
| 2,442,940 | Staudinger et al. | June 8, 1948 |
| 2,744,291 | Stastny | May 8, 1956 |